(12) United States Patent
Chopra et al.

(10) Patent No.: US 9,740,571 B1
(45) Date of Patent: Aug. 22, 2017

(54) INTELLIGENT CONTINUOUS DATA PROTECTION SNAPSHOT BASED BACKUPS

(71) Applicant: EMC IP Holding Company LLC, Hopkinton, MA (US)

(72) Inventors: Shelesh Chopra, Bangalore (IN); Shivanand Chandrashekhar Chougala, Bangalore (IN); Sunaina Rayu, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 14/051,713

(22) Filed: Oct. 11, 2013

(51) Int. Cl.
*G06F 11/14* (2006.01)

(52) U.S. Cl.
CPC .................. *G06F 11/1461* (2013.01)

(58) Field of Classification Search
CPC ................. G06F 11/1448–11/1471
See application file for complete search history.

(56) References Cited

U.S. PATENT DOCUMENTS

| | | | | |
|---|---|---|---|---|
| 5,369,757 A | * | 11/1994 | Spiro et al. ................... 714/19 |
| 5,966,730 A | * | 10/1999 | Zulch ................. G06F 11/1461 707/999.202 |
| 7,296,008 B2 | * | 11/2007 | Passerini et al. |
| 7,640,408 B1 | * | 12/2009 | Halligan ............... G06F 3/0617 711/162 |
| 7,908,515 B1 | * | 3/2011 | Schechner et al. ............. 714/15 |
| 7,925,630 B1 | * | 4/2011 | Krishnamurthy et al. ... 707/649 |
| 2006/0085608 A1 | * | 4/2006 | Saika ............................ 711/162 |
| 2007/0255767 A1 | * | 11/2007 | Kikuchi .............. G06F 11/1469 |
| 2007/0300033 A1 | * | 12/2007 | Kano ............................ 711/170 |
| 2008/0154914 A1 | * | 6/2008 | Kan et al. ....................... 707/10 |
| 2009/0222499 A1 | * | 9/2009 | Tan et al. ...................... 707/204 |
| 2010/0049932 A1 | * | 2/2010 | Tan et al. ...................... 711/162 |
| 2010/0115161 A1 | * | 5/2010 | Rosychuk et al. ............. 710/74 |
| 2010/0198791 A1 | * | 8/2010 | Wu ..................... G06F 11/1451 707/644 |
| 2014/0081911 A1 | * | 3/2014 | Deshpande ......... G06F 11/1448 707/610 |

OTHER PUBLICATIONS

Yang et al. "ST-CDP: Snapshots in TRAP for Continuous Data Protection." Jun. 2012. IEEE. IEEE Transactions on Computers. vol. 61. pp. 753-766.*

* cited by examiner

*Primary Examiner* — Nathan Sadler
(74) *Attorney, Agent, or Firm* — Staniford Tomita LLP

(57) ABSTRACT

A system and method is illustrated for utilizing an agent in intelligent Continuous Data Protection (CDP) snapshot based backups. The system and method utilizing the agent receiving a previous backup bookmark, obtaining a data change rate by calculating a number of bookmarks since the previous backup bookmark, comparing the data change rate with a threshold, initiating a backup when the data change rate exceeds the threshold, and labeling the backup with a bookmark.

20 Claims, 6 Drawing Sheets

INTELLIGENT CONTINUOUS DATA PROTECTION SNAPSHOT BASED BACKUPS

FIELD

The present system and method relates generally to computer systems and specifically to systems and methods of backing up data on computer systems.

BACKGROUND

Continuous Data Protection (CDP) systems have been developed to ensure that new data are stored and modifications to previously stored data are continuously replicated to a storage appliance. A CDP system may be configured to remotely store data associated with every write request that is sent to local storage of a computer. By storing the data associated with every write request, the system ensures that a copy of data stored on a vulnerable, local disk drive is remotely stored and made available in case of disk drive failure. Since every write request is stored, upon restoring the data, no data will be lost.

Leveraging the point-in-time nature of CDP, backups such as CDP snapshots may be taken to allow point-in-time data restore. Conventional CDP snapshot may be scheduled based. Taking snapshots on fixed time intervals may consume unnecessary system resources. For example, when data does not change frequently or has not changed at all since a previously scheduled snapshot, taking unnecessary CDP snapshots based on a rigid schedule wastes system resources.

BRIEF DESCRIPTION OF THE DRAWINGS

Some embodiments of the system and method are described, by way of example, with respect to the following figures.

DETAILED DESCRIPTION

Figure 1:
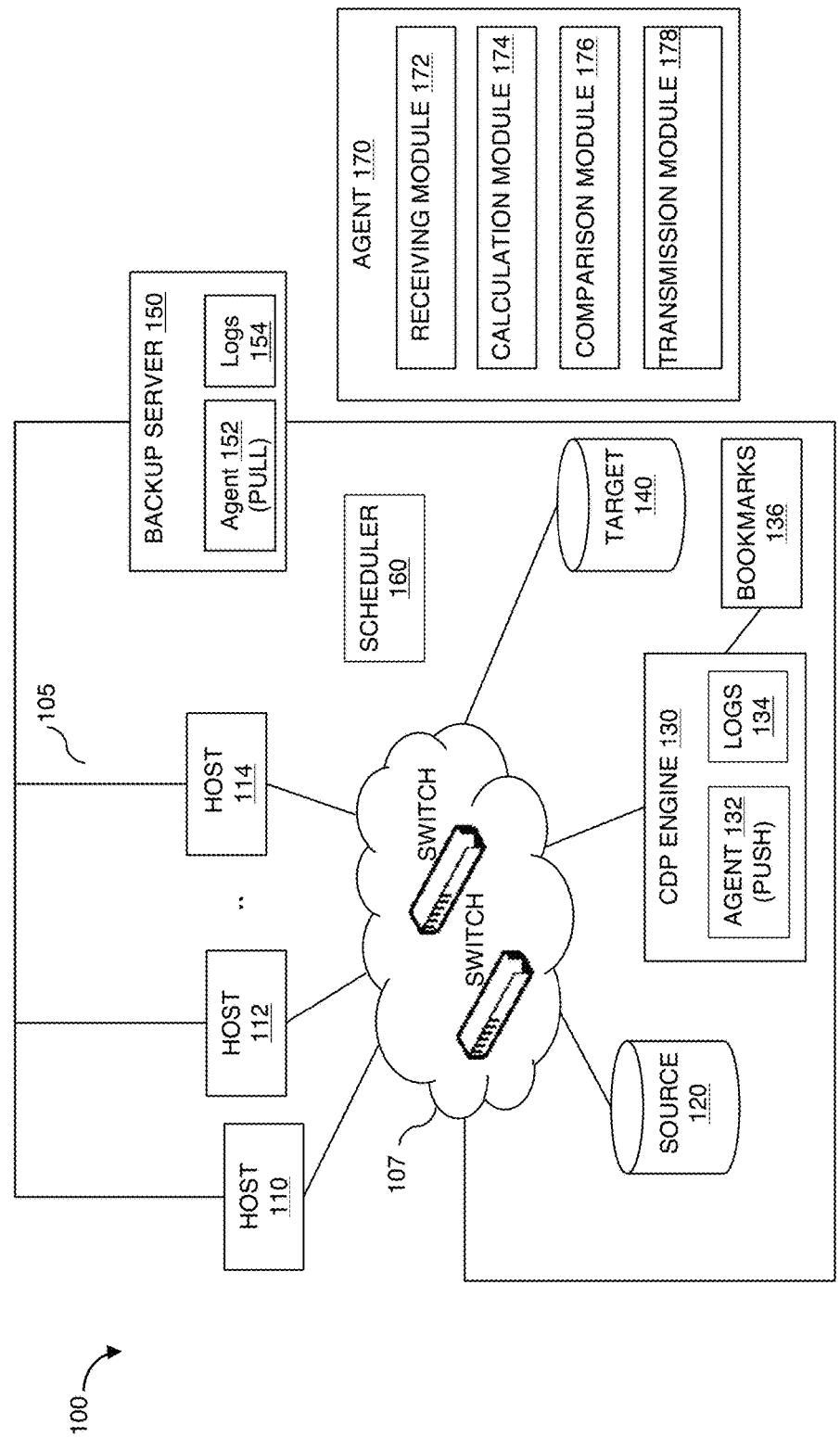
FIG. 1 is a diagram of an example system illustrating the use of an agent for intelligent CDP snapshot based backups.

A detailed description of one or more example embodiments of a system and method is provided below along with accompanying figures. While this system and method is described in conjunction with such embodiment(s), it should be understood that the system and method is not limited to any one embodiment. On the contrary, the scope of the system and method is limited only by the claims and the system and method encompasses numerous alternatives, modifications, and equivalents. For the purpose of example, numerous specific details are set forth in the following description in order to provide a thorough understanding of the present system and method. These details are provided for the purpose of example, and the system and method may be practiced according to the claims without some or all of these specific details. For the purpose of clarity, technical material that is known in the technical fields related to the system and method has not been described in detail so that the present system and method is not unnecessarily obscured.

It should be appreciated that the present system and method may be implemented in numerous ways, including as a process, an apparatus, a device, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the system and method. Applications may also be downloaded, in whole or in part, through the use of a software development kit or toolkit that enables the creation and implementation of the present system and method. In this specification, these implementations, or any other form that the system and method may take, may be referred to as techniques. In general, the order of the steps of disclosed processes may be altered within the scope of the system and method.

Illustrated is a system and method for generating a CDP snapshot based backups utilizing an agent to facilitate the backups. Storage is widely used for storing data associated with computer systems. Storage may be primary storage used for routinely accessed information, or secondary storage providing redundant or archival storage for data recovery in case of data loss in the primary storage system. Examples of primary storage include systems referred to as "production", "source", or "working" data storage systems. Examples of secondary storage include systems referred to as "backup" or "target" systems.

In some example embodiments, a system includes a production application residing on a computer and a CDP engine configured to continually store changes that occur in the production application. Each time data are written by the production application, the changes may be captured by the CDP engine, and the changes involved in the write operation may be recorded by the CDP engine. Thus, the CDP engine is able to retain information about every change to the data written by the production application to directories, volumes, or the like, and a user may later utilize the CDP engine to access stored data as it appeared at a given point in time in the past. An example of a CDP engine may be implemented with RECOVERPOINT®, a product available from EMC Corporation, Hopkinton, Mass.

In some example embodiments, in conjunction with CDP, backups such as snapshots are generated for further data protection. A "snapshot", as used herein, may include a backup copy of data as it appeared at a point in time. The backup copy of data may be of a body of data to be backed up such as a full volume, or may only be an incremental change in that body of data from an earlier snapshot, bookmark, or state. For example, a snapshot may correspond to a single write, a plurality or writes, and may be one of the following types: full volume, incremental, read-only, read/write, clone, consistency group, copy-on-write, low-capacity, or split-mirror, among others. Each snapshot may be labeled with a unique snapshot identifier. For example, in one example embodiment, the snapshot identifier may be the time or a representation of the time that the snapshot was created. In another example embodiment, the snapshot identifier is some other identifier that indicates a correspondence with a related snapshot.

In some example embodiments, a snapshot system maintains at least three volumes: source, target, and journal. The source volume may store data from hosts, and snapshots of data on the source volume may be replicated to the target and journal volumes. The target volume may contain one or more point-in-time images of the data to be replicated that is stored in the source volume. The journal volume may log data changes made from the point in time of the snapshot image in the target volume. When data need to be restored up to a specific point in time, the incremental changes from the journal volume may be used to update the snapshots from the target volume up to the specified time. The journal volume may be a sequential system, so that once a specific point in time is indicated, every item that is stored before or after in the journal volume may be used to update the snapshot from the target volume, as if the target volume snapshot is rolled backward or forward.

In some example embodiments, the CDP engine continuously takes, tracks, and stores snapshots for writes on the source volume. In addition, when a backup server operatively connected to the CDP engine initiates backups, the CDP engine may also create, track, and store CDP snapshot based backups. All events triggering snapshots generation may be marked by bookmarks. The snapshots are, thus, earmarked within the CDP engine, and can later be used for restoring data. A user may use the earmarked snapshots to control over how data are stored to and recovered from the CDP engine. Data may be recovered at a later point-in-time by reading the data that had been stored in the CDP engine at the time of the corresponding event marker.

As used herein, a "bookmark" may be a descriptor entered in the journal volume describing a consistent point in time in replication. The descriptor may be metadata stored in the journal volume associated with the CDP engine. The descriptor may follow different naming conventions so that a user may establish reference points of events and flag different event content for consumption at a later time. In some example embodiments, a backup bookmark is generated by a backup server to establish a reference point of a successful backup. The descriptor for the backup bookmark may follow a naming convention that is different from write event bookmarks. The different backup event naming convention may flag the backup event and allow recognition of a bookmark corresponding to a previous backup event at a later time. As used herein, a previous backup bookmark may be a reference point describing a previous backup event.

The use of bookmarks as event markers allows identifying different snapshots generated by different data change events. For example, one naming convention may be used when the CDP engine continuously records data changes and creates bookmarks for each write event. A different naming convention may be used to label snapshots generated by CDP snapshot based backups. Recognizing the difference in different event marker, data change rate since a previous snapshot backup may be calculated by, for example, summing the number of bookmarks since a previous snapshot bookmark. It should be appreciated that the bookmark summing operation is only one example of an operation that may be used to calculate the data change rate. The data change rate may be calculated by other operations, such as aggregating, counting, differentiating, accumulating, and/or totaling the bookmarks, among others. The calculation result may then be compared to a threshold. When enough changes are detected since a previous snapshot backup, another snapshot may be taken. When not enough changes are detected, another snapshot may be skipped to conserve system resources.

FIG. 1 is a diagram of an example system 100 using an agent for intelligent CDP snapshot based backups. One or more hosts 110-114 may perform input/output (I/O) operations to write data to a source storage 120, and/or to read data from the source storage 120. A write splitter may be operatively coupled to a CDP engine 130 to intercept input/output (I/O) to the source storage 120 and split them to the CDP engine 130 and to the storage. "Operatively coupled" as used herein means a logical or physical connection. In some example embodiments, the write splitter is an agent running on a production host, a switch operatively connected to the CDP engine 130, or a storage array within the example system 100. The CDP engine 130 may be operatively connected to the source storage 120 and configured to continually record the intercepted I/O to the source storage 120. Each time data are written by any production application that is protected by CDP, data changes involved in the write operation may be stored on the CDP Engine 130 as snapshots. With the assistance of the write splitter, the CDP engine 130 is able to retain information about every change to a CDP protected application, directory, volume, or the like, over a period of time.

Figure 2:
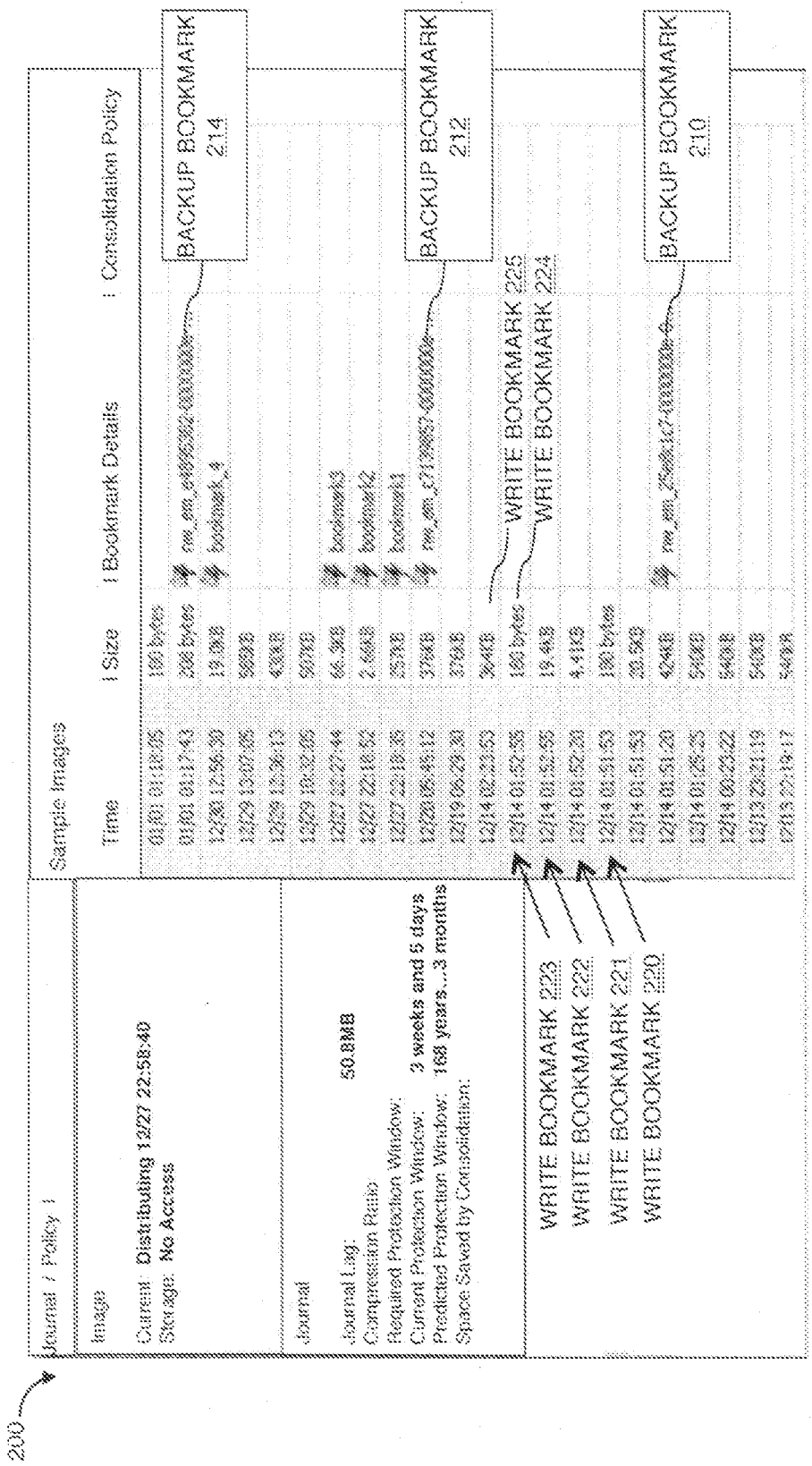
FIG. 2 is a diagram showing an example Graphical User Interface (GUI) illustrating bookmarks used in CDP snapshot based backups.

In conjunction with CDP, CDP snapshot based backups may also be performed for data protection. During backups, a backup server 150 may leverage the snapshots creation and management capacity of the CDP engine 130, create and store CDP snapshots on the CDP engine 130, and store copies of data to a target storage 140. In some example embodiments, a backup server 150 is NETWORKER®, a product available from EMC Corporation, Hopkinton, Mass. The backup server 150 may provide one or more management functions including, by way of non-limiting example, providing an administrator a GUI for display of storage networking topology, storage device management for backups and/or other administrative tasks related to backup. The GUI may provide a plurality of views, each for example with icons or text representatives representing hosts, storage devices, associations there between, and/or properties thereof. An example of the GUI for displaying snapshots and bookmarks 136 associated with the snapshots is illustrated in FIG. 2.

Although the target storage 140 is shown in FIG. 1 as located in a data storage different from the source storage 120, it should be appreciated that the target storage 140 and the source storage 120 may be located in and controlled by separate systems, or may be located within and controlled by the same system 100. Data may be stored in same or different systems, which may be physically within the same physical enclosure, or may be located in different physical enclosures operatively connected to a communication link 105 and a network 107 via a logical or physical connection.

The communication link 105 and the network 107 may provide connectivity among various components of the system 100 and may be implemented using the protocols such as TCP)/IP, of some other logical or physical connection. Hosts 110-114 may be operatively connected to and communicate with other components of the system 100 through the communication link 105 and the network 107. Similarly, the CDP engine 130, the backup server 150, the source storage 120 and the target storage 140 may be operatively connected to and communicate with other components of the system 100 through the communication link 105 and the network 107. The communication link 105 and the network 107 may also be implemented to provide support for various storage architectures such as Storage Area Network (SAN), Network-Attached Storage (NAS), Direct-Attached Storage (DAS), etc. Typical networks used to transfer data between hosts and storage systems include Fibre Channel, SCSI, Ethernet, Gigabit Ethernet, and other types of communication networks. In FIG. 1, two switches are shown for exemplary purposes only. The network 107 may be operatively interconnected via various switches.

In some example embodiments, an agent 170 is used to facilitate CDP snapshot based backups. The agent 170 may include a receiving module 172, a calculation module 174, a comparison module 176, and a transmission module 178, among others. A scheduler 160 may be configured to periodically (e.g. every hour, everyday) trigger the execution of one or more modules of the agent 170. The configuration of the schedule may include time and intervals of the execution.

The receiving module 172 of the agent 170 may be used to receive a bookmark corresponding to a previous backup. The previous backup bookmark may be obtained by querying the CDP engine 130. Upon receiving the previous backup bookmark, the calculation module 174 may be used to calculate the data change rate since the previous backup. An example embodiment of the data change rate calculation is further illustrated in FIG. 2 below. The calculated data change rate may then be compared with a threshold by a comparison module 176. The outcome from the comparison module 176 may determine whether to initiate a backup. A notification module 178 may send out a notification to initiate a backup when the data change rate exceeds the threshold.

The threshold value used by the comparison module 176 may be defined by a user. Alternatively, the threshold may be a system-dependent statistical value based on factors such as historical data change rates, system 100 workload, and/or network 107 performance data, among others. The statistical value may also be offered to the user as a system default and the user may then make adjustments to further define the threshold value.

The various modules of the agent 170 may be implemented in hardware, firmware, or software as part of the system 100. In some example embodiments, the agent 170 resides on the backup server 150 as an agent 152. When the agent 152 resides on the backup server 150, a pull model may be used to probe the CDP engine in order to determine whether to initiate a backup. The pull model is further illustrated in FIG. 3. In some example embodiments, the agent 170 resides on the CDP engine 130 as an agent 132. When the agent 132 resides on the CDP engine 130, a push model may be used to notify the backup server 150 in order to initiate a backup. The push model is further illustrated in FIG. 4.

FIG. 2 is a screenshot of an example GUI 200 provided by the backup server 150, illustrating bookmarks used in CDP snapshot based backups. Each row of the GUI 200 may be a journal entry for a snapshot. Each snapshot may be labeled with a bookmark. Details may be entered for the bookmark either programmatically or manually and stored as metadata in a journal volume operatively coupled to the CDP engine. For example, shown in FIG. 2, bookmarks with details such as "bookmark1", "bookmark2", "bookmark3", and "bookmark4" may be entered manually by users. In contrast, bookmarks 210-214 may be programmatically generated by applications after CDP snapshot based backups. Different applications may have different naming conventions for labeling the snapshots. In FIG. 2, exemplary bookmarks 210-214 may be labels programmatically created by NETWORKER®, a product from EMC Corporation, Hopkinton, Mass. Upon completing a snapshot based backup, as shown in FIG. 2, Networker backup server may label the snapshot using the naming convention of "nw . . . ." It should be appreciated that other backup servers may use similar or equivalent naming conventions. Using different naming convention to label different types of snapshots, the CDP engine may identify bookmarks corresponding to write events and calculate an I/O change rate by operations, such as summing the write event bookmarks since a previous backup. The I/O change rate may then be used to determine if another backup is necessary.

For example, a daily backup may be scheduled according to the configuration by a scheduler. In FIG. 2, on 12/14, upon querying the CDP engine 130, the backup server 150 may determine that a previous backup bookmark does not exist. A snapshot based backup may be initiated promptly and the bookmark 210 may be generated programmatically by the backup server 150 to label the CDP snapshot based backup at 12/14 01:51:20. The bookmark 210 may include descriptive details to establish a reference point of the CDP snapshot based backup event at 12/14 01:51:20 and flag the event content for the data change rate calculation at a later time. In some example embodiments, when a Networker backup server is used to initiate CDP snapshot based backups, the bookmark 210 may include descriptive details such as "nw" at the beginning of the bookmark label. The descriptive details of "nw . . . " flag the event content of a Networker server initiated CDP snapshot based backup. When other backup servers are use in place of a Networker backup server, similar, equivalent, or different naming conventions may be used in the backup bookmarks 210-214 details.

Once the bookmark 210 is created, the agent may examine the bookmarks since the previous backup bookmark 210 in order to determine whether the next daily backup should be performed. For example, on 12/15, the agent may calculate the number of bookmarks since the previous backup bookmark 210. As shown in FIG. 2, only six bookmarks, denoted as 220-225, corresponding to six write events are recorded after the previous backup bookmark 210. In case a user defines a threshold value of seven as an indication of significant data change rate, since the number of write event bookmarks 220-225 is less than the threshold value of seven, not enough data changes have accumulated. Subsequently, the daily backup on 12/15 may be skipped to conserve system resources. Not until 12/20, when at least seven bookmarks have been recorded since the previous backup bookmark 210, another CDP snapshot based backup may be performed, and a bookmark 212 may be generated programmatically. Similarly, backups may be skipped from 12/21 through 12/31. And a backup bookmark 214 labeling a CDP snapshot based backup may be generated programmatically after more than seven bookmarks have been found on the CDP engine since the previous backup bookmark 212.

Figure 3:
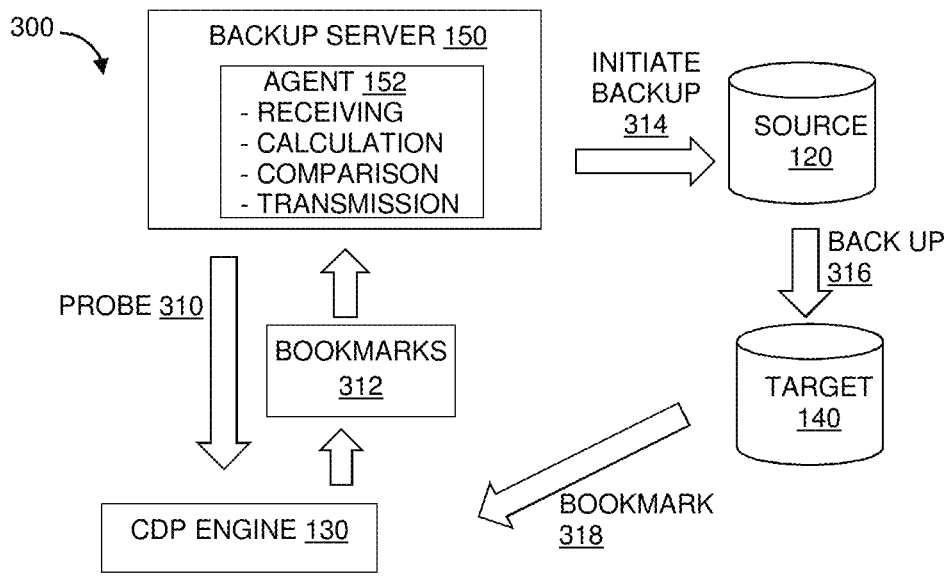
FIG. 3 is a diagram of an example system illustrating performing an intelligent CDP snapshot based backup using a pull model.

FIG. 3 is a diagram of a system 300, according to an example embodiment, illustrating performing an intelligent CDP snapshot based backup using a pull model. In a pull model, an agent 152 may reside on the backup server 150 and continuously run as part of the backup server 150. The agent 152 may periodically transmit a request to probe the CDP engine 130 in order to obtain a data change rate. The act of probing the CDP engine 130 is reflected at 310. Thus, the data change rate may be pulled from the CDP engine 130. The intervals of the probe may be based on a schedule configured by a scheduler. During the probe, the data change rate may be calculated based on bookmarks 312 obtained from the CDP engine 130. The bookmarks 312 may include a previous backup bookmark and a sum of bookmarks created since the previous backup bookmark. The previous backup bookmark may be associated with a previous CDP snapshot based backup. And each of the bookmarks since the previous backup bookmark may be associated with a snapshot of a write operation on the source storage 120. Both the previous backup bookmark and the bookmarks may be stored as metadata in a journal volume operatively coupled to the CDP engine 130. Upon obtaining the data change rate 312 by the calculation module of the agent 152, the comparison module of the agent 152 may compare the data change rate with a threshold. When the data change rate exceeds the threshold, the backup server 150 may initiate a backup 314 to back up 316 the source storage 120 and store the backup on a target storage 140. In some example embodiments, the backup is a CDP snapshot based backup. And a bookmark 318 may be generated to label the CDP snapshot based backup and stored as metadata in a journal volume operatively coupled to the CDP engine 130. Logging 154 of the agent performance result as well as the backup result may be stored on the backup server 150 and/or the CDP engine 130.

Figure 4:
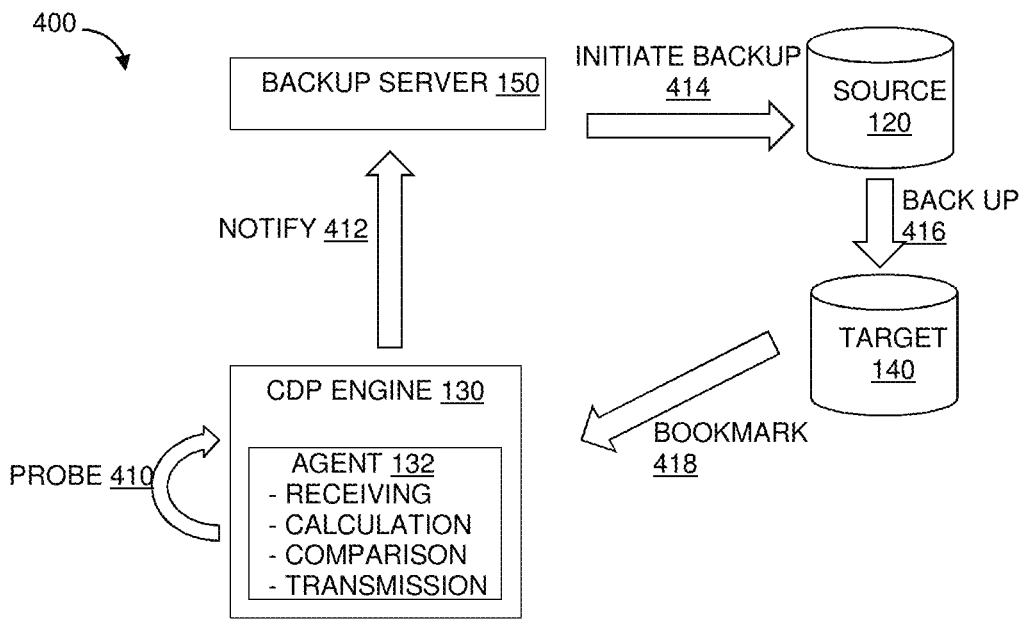
FIG. 4 is a diagram of an example system illustrating performing an intelligent CDP snapshot based backup using a push model.

FIG. 4 is a diagram of a system 400, according to an example embodiment, illustrating performing an intelligent CDP snapshot based backup using a push model. In a push model, an agent 132 may reside on a CDP engine 130 and continuously run as part of the CDP engine 130. In some example embodiments, instead of residing on the CDP engine 130, the agent 132 resides on and continuously run on a switch operatively connected to the CDP engine 130 or a write splitter operatively coupled to the CDP engine 130. The agent 132 may periodically execute a probe 410 of the CDP engine 130 in order to determine when to transmit a notification to notify 412 a backup server 150 for a backup. Thus, the agent 132 may push the notification to the backup server 150 to initiate a backup. The intervals of the probe may be based on a schedule configured by a scheduler. During the execution of the probe 410, a data change rate may be calculated based on a previous backup bookmark and a sum of bookmarks created since the previous backup bookmark. The previous backup bookmark may be associated with a previous CDP snapshot based backup. And each of the bookmarks since the previous backup bookmark may be associated with a snapshot of a write operation on the source storage 120. Both the previous backup bookmark and the bookmarks may be stored as metadata in a journal volume operatively coupled to the CDP engine 130. Upon calculating the data change rate by the calculation module of the agent 132, the comparison module of the agent 132 may compare the data change rate with a threshold. When the data change rate exceeds the threshold, the agent 132 may transmit a notification to notify 412 the backup server 150, and the backup server 150 may initiate a backup 414 to back up 416 the source storage 120 and store the backup on the target storage 140. In some example embodiments, the backup is a CDP snapshot based backup. And a bookmark 418 may be generated to label the CDP snapshot based backup and stored as metadata in a journal volume operatively coupled to the CDP engine 130. Logging 134 of the agent performance result as well as the backup result may be stored on the backup server 150 and/or the CDP engine 130.

Both the pull model, as illustrated in FIG. 3, and the push model, as illustrated in FIG. 4, may conserve system resources by skipping unnecessary backups. Intelligence may be built into logics of the agent. Instead of performing periodic backups, the agent periodically performs analysis of the data change rate, and only when the data change rate exceeds a threshold, a backup may be considered necessary and performed. Relative to the pull model illustrated in FIG. 3, the agent 132 in a push model may run outside the backup server 150. System resources of the backup server 150 may be freed for other backup related tasks. The backup server 150 may initiate a backup only upon receiving a notification from the agent 132. On the other hand, the agent 352 of the pull model may run on and as part of the backup server 150. All backup related tasks including the analysis of the data change rate and the intelligent decision of whether to perform a backup may be conducted and managed at one central location.

Figure 5:
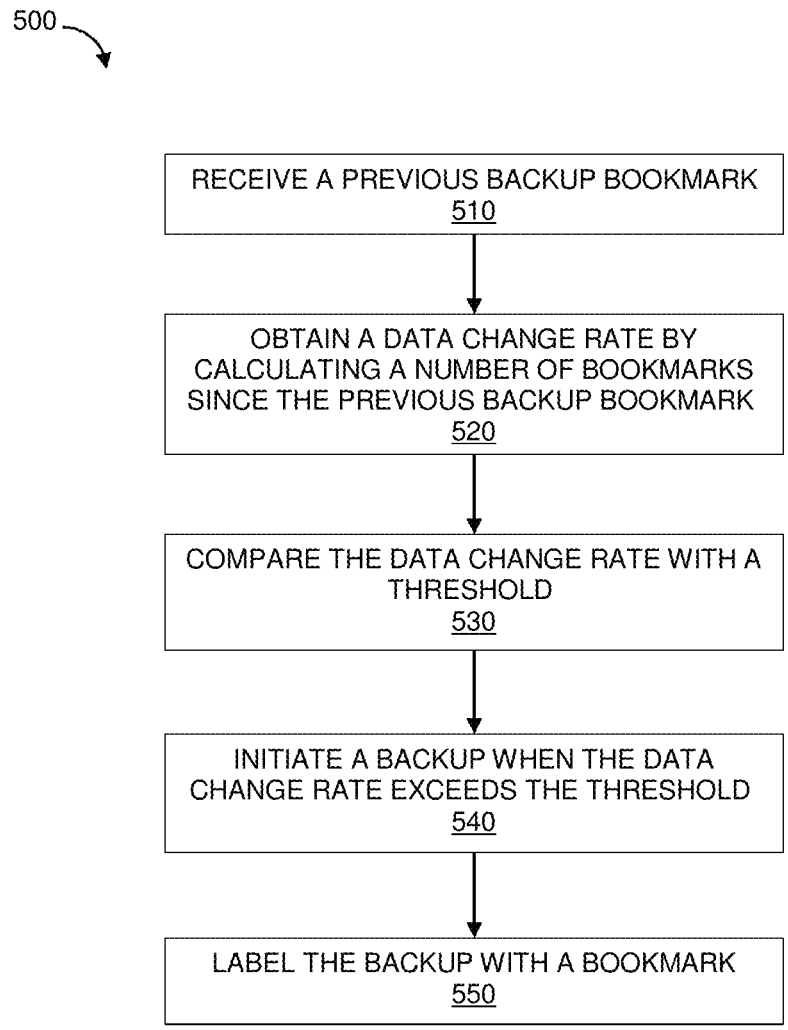
FIG. 5 is a diagram of an example computer implemented method executed to perform an intelligent CDP snapshot based backup.

FIG. 5 is a diagram of a computer implemented method 500, according to an example embodiment, executed by the agent 170 to perform an intelligent CDP snapshot based backup. An operation 510 is executed to receive a previous backup bookmark. In some example embodiments, when the previous backup bookmark is not received, a backup is initiated and a bookmark may be created to label the backup, operation 550. The situation of not receiving the previous backup bookmark may arise when a new consistency group is created or when previous snapshot backups were purged by a user, such as an administrator. Upon receiving the previous backup bookmark, an operation 520 is executed to calculate a data change rate based upon, for example, a sum of bookmarks since the previous backup bookmark. It should be appreciated that the bookmark summing operation is only one example of an operation that may be used to calculate the data change rate. The data change rate may be calculated by other operations, such as aggregating, counting, differentiating, accumulating, and/or totaling the bookmarks, among others. Having calculated the data change rate, an operation 530 is executed to compare the data change rate with a threshold. The threshold may be a value defined by a user. In some example embodiments, the threshold is a statistical value provided by the system based on previous backups. When the data change rate exceeds the threshold, an operation 540 is executed to initiate a backup.

Figure 6:
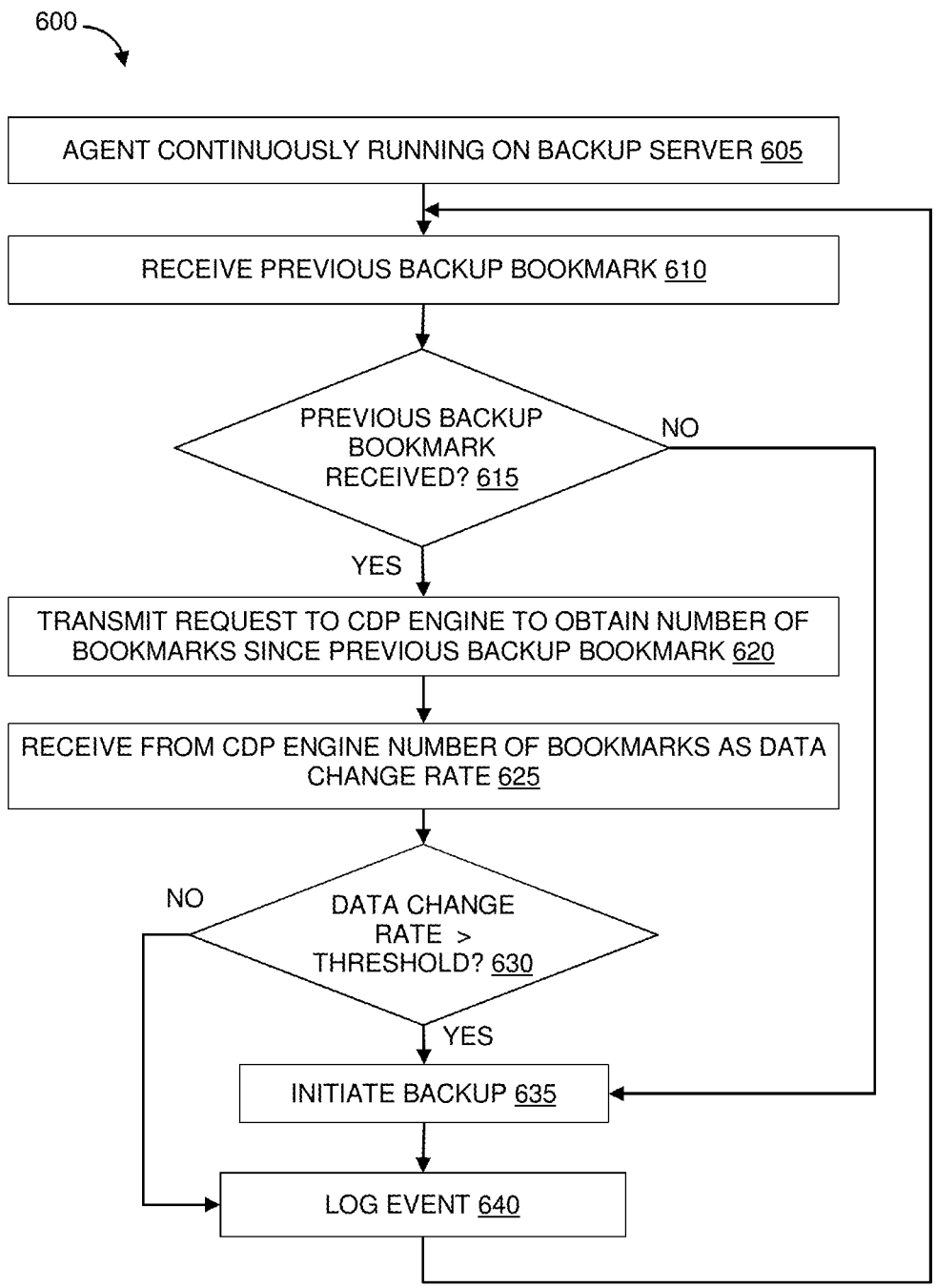
FIG. 6 is a flowchart illustrating the execution of an example operation to perform intelligent CDP snapshot based backups using a pull model.

FIG. 6 is a flowchart illustrating an example method 600 of a pull model executed by the agent 152 and used to perform intelligent CDP snapshot based backups. Illustrated are operations 605 through 640 that are executed by, for example, the agent 152 residing on the backup server 150. Operation 605 is executed to start the intelligent CDP snapshot based backups. The agent 152 may reside on the backup server 150 and continuously run as part of the backup server 150. Periodically, based on a schedule configured by the scheduler 160, operations 610 through 640 may be executed. Operation 610 is executed to retrieve a bookmark corresponding to a previous backup from the CDP engine 130. A decisional operation 615 is executed to determine whether the previous backup bookmark exists. In case a previous backup has been performed, the previous backup bookmark may be received by the agent 152, and the operation 620 is executed to transmit a request to the CDP engine 130 in order to calculate bookmarks created since the previous backup. In case a previous backup has not been performed, the agent 152 may not receive the previous backup bookmark, and an operation 635 is executed to initiate a backup. The nonexistence of the previous backup bookmark may be due to a new consistency group was set up and/or a user recently purged previous backups. Following the transmission request executed in the operation 620, an operation 625 is executed to receive from the CDP engine 130 the number of the bookmarks created since the previous backup. The number of the bookmark may be used to calculate the data change rate since the previous backup. Having calculated the data change rate, a decisional operation 630 is executed to determine whether the data change rate exceeds a threshold. In case, the data change rate exceeds the threshold, the operation 635 is executed to initiate a backup followed by an operation 640 to log events. In case, the data change rate fails to exceed the threshold, the operation 640 is executed to log events. Following the operation 640, the agent 152 may execute operations 610 through 640 again after an interval based on the schedule.

Figure 7:
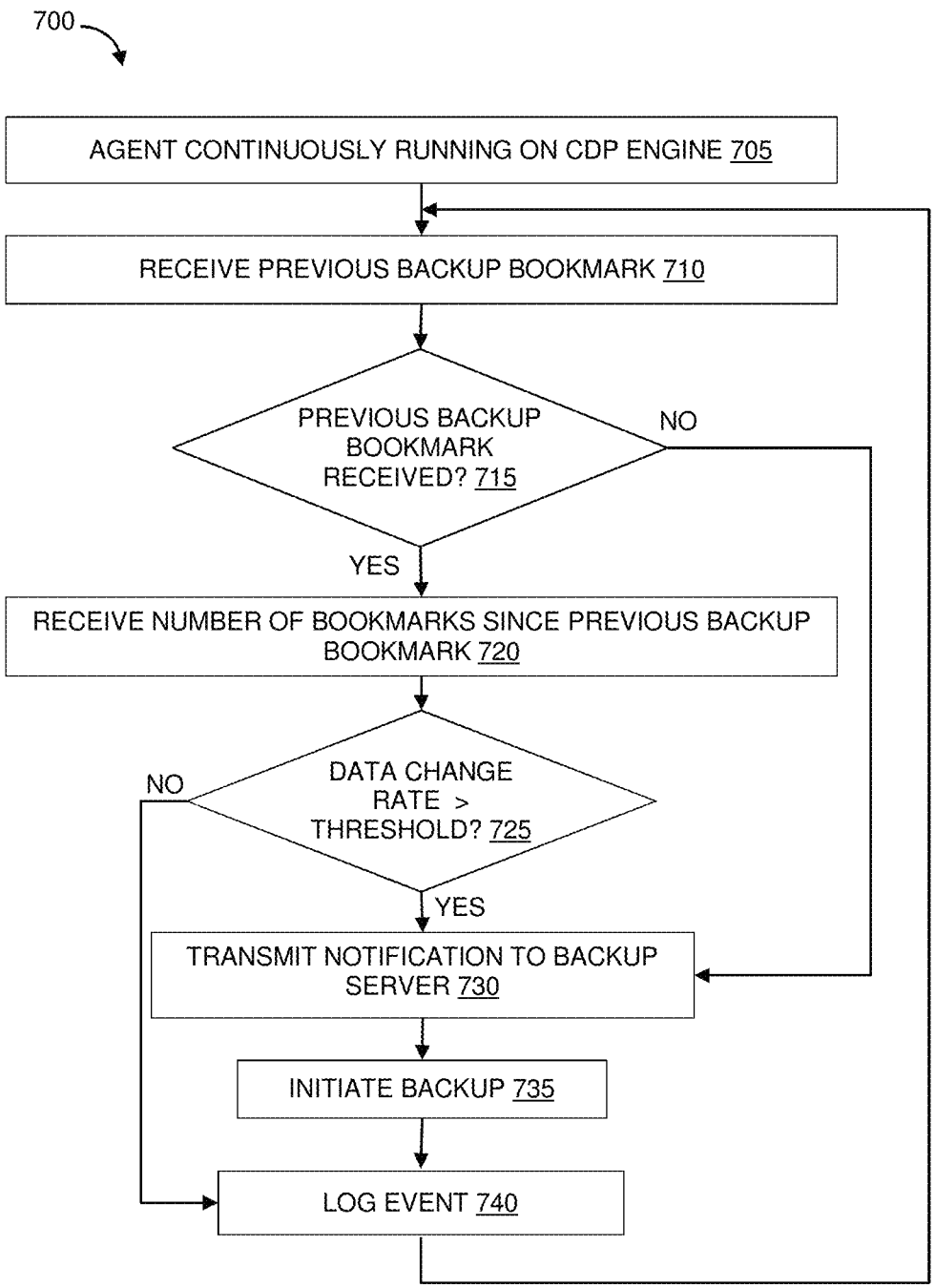
FIG. 7 is a flowchart illustrating the execution of an example operation to perform intelligent CDP snapshot based backups using a push model.

FIG. 7 is a flowchart illustrating an example method 700 of a push model executed by the agent 132 used to perform intelligent CDP snapshot based backups. Illustrated are operations 705 through 740 that are executed by, for example, the agent 132 residing on the CDP engine 130. Operation 705 is executed to start the intelligent CDP snapshot based backups. The agent 132 may reside on the CDP engine 130 and continuously run as part of the CDP engine 130. In some embodiments, instead of residing on the CDP engine 130, the agent 132 resides on a switch operatively connected to the CDP engine 130 or a write splitter operatively coupled to the CDP engine 130. Periodically, based on a schedule configured by the scheduler 160, operations 710 through 740 may be executed. An operation 710 is executed to retrieve a bookmark corresponding to a previous backup from the CDP engine 130. A decisional operation 715 is executed to determine whether the previous backup bookmark exists. In case a previous backup has been performed, the previous backup bookmark may be received by the agent 132, and an operation 720 is executed to obtain from the CDP engine 130 the bookmarks created since the previous backup. The number of the bookmark may be used to calculate the data change rate since the previous backup. In case a previous backup has not been performed, the agent 132 may not receive the previous backup bookmark, and an operation 730 is executed to transmit a notification to the backup server 150. The nonexistence of the previous backup bookmark may be due to a new consistency group was set up and/or a user recently purged previous backups. Upon receiving the sum of the bookmarks, a decisional operation 725 is executed to determine whether the data change rate exceeds a threshold. In case, the data change rate exceeds the threshold, the operation 730 is executed to transmit a notification to the backup server 150. The notification may instruct the backup server 150 to initiate a backup in operation 735, followed by an operation 740 to log events. In case, the data change rate fails to exceed the threshold, the operation 740 is executed to log events. Following the operation 740, the agent 132 may execute operations 710 through 740 again after an interval based on the schedule.

For the sake of clarity, the processes and methods herein have been illustrated with a specific flow, but it should be understood that other sequences may be possible and that some may be performed in parallel, without departing from the spirit of the system and method. Additionally, steps may be subdivided or combined.

All references cited herein are intended to be incorporated by reference. Although the present system and method has been described above in terms of specific embodiments, it is anticipated that alterations and modifications to this system and method will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the system and method is not to be limited to the details given herein. It is therefore intended that the disclosure and following claims be interpreted as covering all such alterations and modifications as fall within the true spirit and scope of the system and method.

What is claimed is:

1. A computer implemented method comprising:
receiving by an agent running on a computer, a previous backup bookmark, the bookmark comprising a descriptor comprising metadata generated by a backup server to establish a reference point of a successful snapshot backup, which is denoted as a backup bookmark;
obtaining by the agent, a data change rate by calculating a number of bookmarks since the previous backup bookmark, wherein the agent is one of a pull model agent residing on the backup server and probes a Continuous Data Protection (CDP) engine to obtain the data change rate, or a push model agent residing on the CDP engine to probe the CDP engine to notify the backup server to initiate a backup according to scheduled probe intervals;
defining a threshold value dictating whether or not to initiate a next scheduled backup;
comparing by the agent, the data change rate with the threshold;
when the data change rate exceeds the threshold, initiating the next scheduled backup by the agent, and labeling by the agent, the backup with a backup bookmark; and when the data change rate does not exceed the threshold, skipping the next scheduled backup.

2. The method of claim 1 wherein each bookmark is stored in a journal volume associated with the CDP engine.

3. The method of claim 1, wherein the calculating comprises receiving in the pull agent, from the Continuous Data Protection (CDP) engine, the number of the bookmarks as the data change rate, the method further comprising:
deriving the data change rate for snapshot backups, wherein the data change rate is calculated by one of: summing, aggregating, counting, differentiating, and accumulating a number of bookmarks since the previous backup bookmark.

4. The method of claim 1, further comprising;
receiving, on a periodic basis, via the push agent that resides on the Continuous Data Protection (CDP) engine, the number of the bookmarks since the previous backup bookmark, and wherein the threshold comprises a system-dependent statistical value based on at least one of: historical data change rates, system workload, and network performance data.

5. The method of claim 4, wherein the CDP engine includes at least one of: a switch connected to the CDP engine, or a write splitter operatively coupled to the CDP engine.

6. The method of claim 1, wherein the threshold is a value defined by at least one of a user or a statistical value based upon previous data change rates, and wherein calculating the number of the bookmarks includes summing the number of bookmarks since the previous backup bookmark.

7. The method of claim 1, wherein the bookmark conforms to a naming convention distinguishing write events from snapshot backups.

8. A system comprising:
a computer; and
an agent running on the computer, the agent having a plurality of modules executing on the at least one processor, wherein the plurality of modules comprise:
a receiving module, that resides on the agent, to receive a previous backup bookmark, the bookmark comprising a descriptor comprising metadata generated by a backup server to establish a reference point of a successful snapshot backup, which is denoted as a backup bookmark;
a calculation module, that resides on the agent, to obtain a data change rate by calculating a number of bookmarks since the previous backup bookmark, wherein the agent is one of a pull model agent residing on a backup server and probes a Continuous Data Protection (CDP) engine to obtain the data change rate, or a push model agent residing on the CDP engine to probe the CDP engine to notify the backup server to initiate a backup according to scheduled probe intervals;
a defining module defining a threshold value dictating whether or not to initiate a next scheduled backup;
a comparison module, that resides on the agent, to compare the data change rate with the threshold;
a module initiating the next scheduled backup by the agent when the data change rate exceeds the threshold, and skipping the next scheduled backup when the data change rate does not exceed the threshold; and
a transmission module, that resides on the agent, to transmit a notification when the data change rate exceeds the threshold.

9. The system of claim 8, wherein the bookmark conforms to a naming convention distinguishing write events from snapshot backups, and:
the receiving module of the agent transmits, on a periodic basis, a request to the CDP engine to obtain the number of bookmarks since the previous backup bookmark, and wherein the calculation module receives from the CDP engine a number of bookmarks as the data change rate; and further
wherein the backup server to initiate a backup when receiving the notification from the transmission module of the agent and the CDP engine labels the backup with a backup bookmark, and wherein each backup bookmark is stored in a journal volume associated with the CDP engine.

10. The system of claim 8, wherein the bookmark conforms to a naming convention distinguishing write events from snapshot backups, and:
the computer is the CDP engine and the agent resides on the CDP engine, wherein the calculation module of the agent receives, on a periodic basis, the number of bookmarks since the previous backup bookmark as the data change rate; and
the transmission module of the agent transmits the notification to the backup server, when the data change rate exceeds the threshold; and further
wherein the backup server to initiate a backup upon receiving the notification and the CDP engine labels the backup with a backup bookmark.

11. The system of claim 10, wherein the CDP engine includes at least one of: a switch connected to the CDP engine, or a write splitter operatively coupled to the CDP engine.

12. The system of claim 8, wherein the threshold is a value defined by a user or a system-dependent statistical value based on at least one of: historical data change rates, system workload, and network performance data.

13. The system of claim 8, wherein the data change rate is calculated by one of: summing, aggregating, counting, differentiating, and accumulating a number of bookmarks since the previous backup bookmark.

14. A machine-readable medium including instructions embodied in a tangible, non-transitory, computer readable storage medium and comprising computer instructions for:
receiving by an agent running on a computers, a previous backup bookmark, the bookmark comprising a descriptor comprising metadata generated by a backup server to establish a reference point of a successful snapshot backup, which is denoted as a backup bookmark;
obtaining by the agent, a data change rate by calculating a number of bookmarks since the previous backup bookmark, wherein the agent is one of a pull model agent residing on the backup server and probes a Continuous Data Protection (CDP) engine to obtain the data change rate, or a push model agent residing on the CDP engine to probe the CDP engine to notify the backup server to initiate a backup according to scheduled probe intervals;
defining a threshold value dictating whether or not to initiate a next scheduled backup;
comparing by the agent, the data change rate with the threshold;
when the data change rate exceeds the threshold, initiating the next scheduled backup by the agent, and labeling by the agent, the backup with a backup bookmark; and
when the data change rate does not exceed the threshold, skipping the next scheduled backup.

15. The machine-readable medium of claim 14, wherein each bookmark is stored in a journal volume associated with the CDP engine.

16. The machine-readable medium of claim 15, wherein the bookmark conforms to a naming convention distinguishing write events from snapshot backups.

17. The machine-readable medium of claim 14, wherein the calculating comprises receiving, from a Continuous Data Protection (CDP) engine, the number of the bookmarks as the data change rate, and further comprising instructions for:
- defining a different bookmark for other write events not comprising a snapshot backup to snapshot backups from the other write events; and
- deriving the data change rate for snapshot backups, wherein the data change rate is calculated by one of: summing, aggregating, counting, differentiating, and accumulating a number of bookmarks since the previous backup bookmark.

18. The machine-readable medium of claim 14, further comprising receiving, on a periodic basis, via an agent that resides on a Continuous Data Protection (CDP) engine, the number of the bookmarks since the previous backup bookmark.

19. The machine-readable medium of claim 18, wherein the CDP engine includes at least one of: a switch connected to the CDP engine, or a write splitter operatively coupled to the CDP engine.

20. The machine-readable medium of claim 14, wherein the threshold is a value defined by a user or a statistical value based upon previous data change rates, and further comprising instructions for calculating the number of the bookmarks includes summing the number of bookmarks since the previous backup bookmark.

* * * * *